United States Patent [19]

Fassauer

[11] Patent Number: 5,311,727
[45] Date of Patent: May 17, 1994

[54] FLOATATION CUTTING APPARATUS WITH SUPPORT SURFACE SEALANT AND CENTRIFUGE CHAMBER

[76] Inventor: Arthur L. Fassauer, 420 Foster La., Canyon, Tex. 79015

[21] Appl. No.: 918,202

[22] Filed: Jul. 20, 1992

[51] Int. Cl.$^5$ .............................................. A01D 34/72
[52] U.S. Cl. ..................................... 56/12.8; 56/320.1
[58] Field of Search ...................... 56/12.8, 12.9, 13.4, 56/320.1, 320.2, DIG. 3

[56] References Cited

U.S. PATENT DOCUMENTS

| | | | |
|---|---|---|---|
| 3,170,276 | 2/1965 | Hall | 56/12.8 |
| 3,186,151 | 6/1965 | Hansom | 56/12.8 |
| 3,293,836 | 12/1966 | Heth | 56/12.8 |
| 3,400,523 | 9/1968 | Klingofstrom et al. | 56/12.8 |
| 3,838,558 | 10/1974 | Goodchild | 56/12.8 |
| 4,245,455 | 1/1981 | Martin | 56/12.8 |
| 5,048,275 | 9/1991 | Fassauer | 56/12.8 |
| 5,101,615 | 5/1992 | Fassauer | 56/12.8 |
| 5,117,619 | 6/1992 | Fassauer | 56/DIG. 3 X |

FOREIGN PATENT DOCUMENTS

0045177 2/1982 European Pat. Off. .
2028089 3/1980 United Kingdom .

Primary Examiner—David J. Bagnell
Attorney, Agent, or Firm—Daniel V. Thompson

[57] ABSTRACT

An air floated cutting apparatus is provided having a housing configured to define a cup-shaped centrifuge chamber along an inner peripheral wall of the housing for centrifuging cuttings. An impeller is located in the housing to force air outwardly along an interior wall of the housing to pressurize the interior of the housing. The air moves outwardly and downwardly along the interior wall in a top portion of the housing and then inwardly and downwardly along the interior wall in a bottom portion of the housing toward a support surface beneath the housing. The lowermost portion of the interior housing wall is angled downwardly less than 30 degrees with respect to a horizontal axis for directing air inwardly and downwardly at a predetermined angle. In one embodiment the interior housing wall defines the centrifuge chamber in the presence of the downward air flow. In another embodiment, means is provided for defining a centrifuge chamber separate from an air pressure chamber in which air flows downwardly. The centrifuge chamber includes a shelf for centrifuging grass cuttings within the centrifuge chamber. A glide plate is formed on a bottom part of the housing to inhibit the loss of air pressure from the housing and to enhance the gliding movement of the cutting apparatus over the ground or other support surface. Air pressure acting on an undersurface of the glide plate also enhances the lifting force on the housing.

18 Claims, 7 Drawing Sheets

FLOATATION CUTTING APPARATUS WITH SUPPORT SURFACE SEALANT AND CENTRIFUGE CHAMBER

FIELD OF INVENTION

The present invention pertains in general to floatation type cutting apparatus, such as lawn mowers and, more particularly, to a floatation type cutting apparatus having a centrifuge chamber disposed around the periphery of the apparatus to allow cuttings to be centrifugally moved to an exit port.

CROSS-REFERENCE TO RELATED APPLICATIONS

The present application is related to U.S. patent application Ser. No. 395,799, filed Aug. 18, 1989, abandoned; U.S. patent application Ser. No. 528,718, filed May 24, 1990, now U.S. Pat. No. 5,101,615; U.S. patent application Ser. No. 680,787, now U.S. Pat. No. 5,117,619; U.S. patent application Ser. No. 700,483, filed Mar. 15, 1991 now U.S. Pat. No. 5,263,304; U.S. patent application Ser. No. 680,788, filed Apr. 3, 1991 now U.S. Pat. No. 5,123,235; and U.S. patent application Ser. No. 857,766, filed Mar. 26, 1992, now U.S. Pat. No. 5,205,113.

BACKGROUND OF THE INVENTION

Present wheeled lawn mowers require wheels for the support thereof. The wheels are adjustable to determine the cutting height of the lawn mower blade. A disadvantage of the conventional wheeled lawn mowers is that they are unwieldy and difficult to maneuver around shrubbery, obstacles, swath turns, etc. Although some of the self-propelled lawn mowers have reduced the amount of effort required to maneuver the lawn mower, turning and maneuvering is still somewhat difficult. Additionally, air cushioned mowers that are wheelless have been utilized which provide an air cushion for support thereof a small distance above the ground.

Typical "air cushioned" lawn mowers have a housing with a very narrow bottom surface and a turned up external lip. During operation, air is blown toward the ground by the impeller, which results in a substantial portion of the air escaping from the housing between the ground and the bottom surface. This rapid escape of air from beneath the narrow bottom surface of the mower housing substantially reduces the lifting force on the housing and stirs up dust and debris while mowing around shrubbery and the like. Additionally, the downward air pressure on the interior housing wall, which is required to keep the housing afloat, depresses and flattens the grass, causing the cutting blade to leave an uneven cut. The narrow bottom surface of the mower housing penetrates into the grass, causing the housing to sink into the grass area.

Another disadvantage of prior air cushioned mowers is the inability to centrifuge grass in the presence of high air pressure flow projected downward on a vertical or near vertical wall having an angle of declination of approximately 75 to 85 degrees downward, or on a curved wall that extends downwardly and inwardly at an angle of declination of approximately 35 to 45 degrees. The downward air pressure flow which is required to lift the housing also conveys grass clippings to ground level, which results in a constant buildup of grass clippings in the housing, thus producing a windrow of grass cuttings below and on the backside of the mower. These clippings must then be raked up if the grass is allowed to become too long between cuttings.

DISCLOSURE OF THE INVENTION

In accordance with the present invention, an air floated cutting apparatus, such as a lawn mower, is provided. The apparatus includes a substantially endless housing having an interior surface and an exterior surface, rotatable air moving means located in the housing for pressurizing air within the housing sufficient to float the housing above a support surface, rotatable cutting means located in the housing for cutting vegetation and drive means for rotating the air moving means and the cutting means.

In accordance with a unique feature of the invention, a lower portion of the interior surface of the housing is angled inwardly and downwardly at an angle less than 30 degrees with respect to a horizontal axis for directing air inwardly and downwardly within the housing. Centrifuge means is located in the housing and defines a centrifuge raceway for centrifuging vegetation cut by the cutting means. In one embodiment, an upper portion of the interior surface extends outwardly and downwardly. The upper portion of the interior surface cooperates with the lower portion thereof to define the centrifuge means. The lower portion provides a shelf for the centrifuged cuttings. The centrifuge raceway is therefore provided in combination with an air pressure chamber within the housing. In another embodiment, the centrifuge means is spaced inwardly from the interior surface of the housing to define the centrifuge raceway inside the centrifuge means and an air pressure chamber separate from the centrifuge raceway between the centrifuge means and the interior surface of the housing, such that air can flow between an outer surface of the centrifuge means and the interior surface of the housing.

In accordance with another unique feature of the invention, the centrifuge means includes diverter means for diverting the flow of air in the air pressure chamber at a predetermined angle relative to a horizontal axis.

In accordance with yet another unique feature of the invention, the apparatus includes ring means extending around a bottom periphery of the housing. The compression ring means has a vertical inner surface for directing air vertically downward.

In accordance with the further unique feature of the invention, plate means is located on a bottom part of the ring means. The glide sealant plate means extends substantially parallel to a horizontal axis. It can be seen that the present invention utilizes a dual radiused support glide plate that enhances the gliding flotation. Air pressure acting on an undersurface of the plate means exerts a lifting force on the housing. The plate means cooperates with the ring means to inhibit the escape of air from beneath the housing. In one embodiment, the plate means extends outwardly from the bottom part of the ring means. The plate means also enhances the gliding movement of the housing over the ground or other support surface.

In accordance with still a further unique feature of the invention, the apparatus includes a shroud at least partially surrounding the housing and defining a suction chamber between the shroud and housing. The air moving means, which is preferably a rotatable impeller, is adapted to draw material, such as grass cuttings, dust and other debris, from a support surface beneath the housing upwardly through the suction chamber and into the housing for cutting by the cutting means, as well as a dust free outer perimeter environment.

In accordance with the present invention, means is provided for varying the direction of the air flow in an air-floated housing to vary the ground effect provided by the air flow. Means is further provided for centrifuging cuttings within the housing for delivery through an external delivery port or for being recut and recycled as mulch. Sealant means is provided for inhibiting the loss of air pressure from beneath the housing to maintain sufficient air pressure within the housing for lifting the housing above the ground or other support surface. In accordance with another aspect of the invention, means is provided for vacuuming cuttings and other debris from the support surface and introducing the vacuumed cuttings back into the housing for recutting.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE PREFERRED EMBODIMENT

Figure 1:
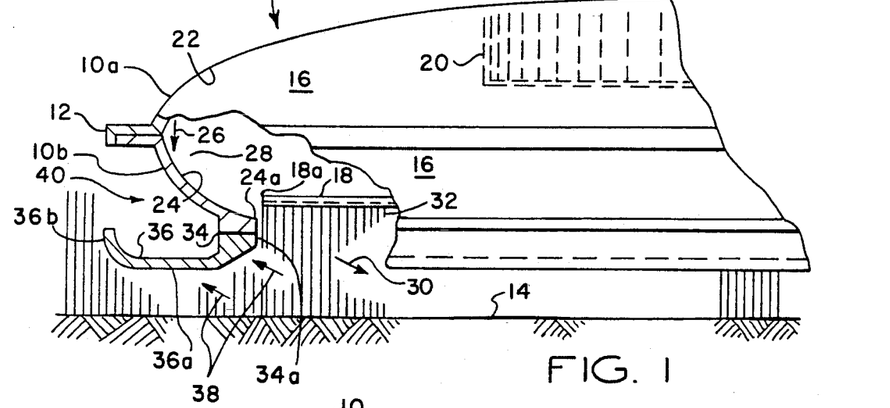
FIGS. 1, 1A and 1B are respective partial side cutaway view of various embodiments of an air cushioned lawn mower with support surface sealant and a centrifuge chamber, according to the present invention.

Referring now to FIG. 1, a lawn mower housing 10 is comprised of upper and lower housing portions 10a and 10b, respectively, with an external mating rim member 12 intermediate upper and lower housing portions 10a and 10b defining an outer periphery of housing 10. Housing 10 cooperates with a support surface 14 (e.g., the ground beneath the lawn mower) to define an enclosed chamber 16. A cutting blade 18 is rotatably mounted within chamber 16. An impeller 20 is also rotatably mounted within chamber 16 for receiving air through an opening (not shown) in housing 10 and for directing air outwardly along an interior wall 22 of upper housing portion 10a, to pressurize chamber 16, whereby housing 10 is floated slightly above support surface 14.

Air flows downwardly along interior wall 22 and interior wall 24 of lower housing portion 10b, which represents a path of least resistance to the air flow. The downward air flow along interior walls 22 and 24 as indicated by arrow 26.

Interior wall 22 is curved downwardly and outwardly and interior wall 24 is curved downwardly and inwardly, such that interior walls 22 and 24 define a cup-shaped raceway, indicated generally at 28, within housing 10. Raceway 28 provides a centrifuge raceway for centrifuging cut grass and other loose material in chamber 16.

Lowermost portion 24a of interior wall 24 is oriented at an angle of approximately 25 to 29 degrees with respect to a horizontal plane defined by support surface 14, such that air is directed downwardly and inwardly at an angle of approximately 25 to 29 degrees, as indicated by arrow 30. It has been determined that if lowermost portion 24a is oriented at a steeper angle (e.g., 30 degrees or more) with respect to the horizontal, the downward flow of air interferes with the centrifuging of the grass clippings, thereby resulting in substantial amount of the grass clippings being directed downwardly into uncut grass 32. Interior wall 24 serves as a shelf to support the centrifuged grass clippings and direct the clippings to a delivery port (not shown) for bagging or mulching. Interior wall 24 also inhibits the escape of air from beneath housing 10 by directing air flow inwardly within housing 10, thereby maintaining sufficient pressure within chamber 16 to float housing 10 above support surface 14.

Figure 2:
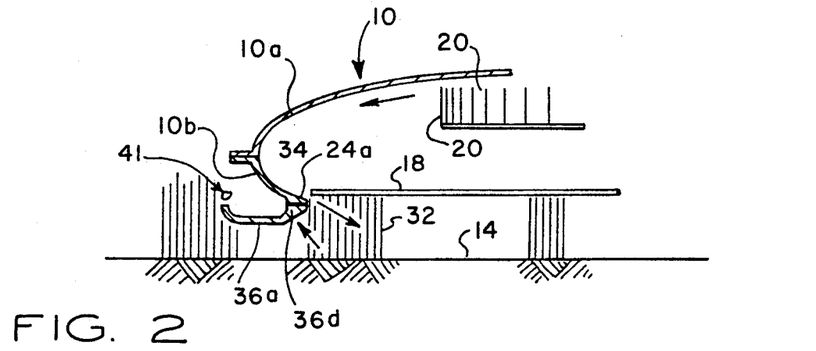
FIGS. 2, 3, 4 and 5 are respective side cutaway views of various alternative embodiments of the lawn mower of FIG. 1.

A compression ring 34 is formed beneath lowermost portion 24a. Ring 34 has an interior vertical surface 34a for directing at least some of the air flowing along interior surface 24 vertically downward. The vertically downward flowing air acts on an undersurface 36a of a glide plate 36, which projects outwardly from vertical compression ring 34. Arrows 38 indicate the air pressure acting on undersurface 36a, to enhance the lifting force on housing 10. The relatively flat undersurface 36a also enhances the "gliding" movement of housing 10 over support surface 14, such that housing 10 does not sink into grass 32. A distal peripheral edge 36b of glide plate 36 is slightly upturned to define a region 40 between glide plate 36 and housing 10, for shielding an operator's appendages. Region 40 also traps debris, such as rocks 41 (see FIG. 2), to help keep debris away from the path of blade 18. The vertical extension of ring 34 also inhibits access to blade 18, to help protect the operator's appendages. As shown in FIG. 1, distal end 18a of blade 18 is located slightly above lowermost portion 24a. Lowermost portion 24a receives grass clippings cut by blade 18 and projected outwardly by the tip speed of blade 18. Lowermost portion 24a is sufficiently horizontal to provide a shelf for supporting the centrifuged grass clippings, but also includes a downward component for directing air downwardly for flotation of housing 10. In FIG. 1, a centrifuge raceway 28 is provided for centrifuging cuttings in the presence of a downward air flow which provides a lifting force by ground effect, in a single air-floated housing in combination with the underside of glide plate 36a and opposing angle 38 outward to maximize lift.

Figure 1A:
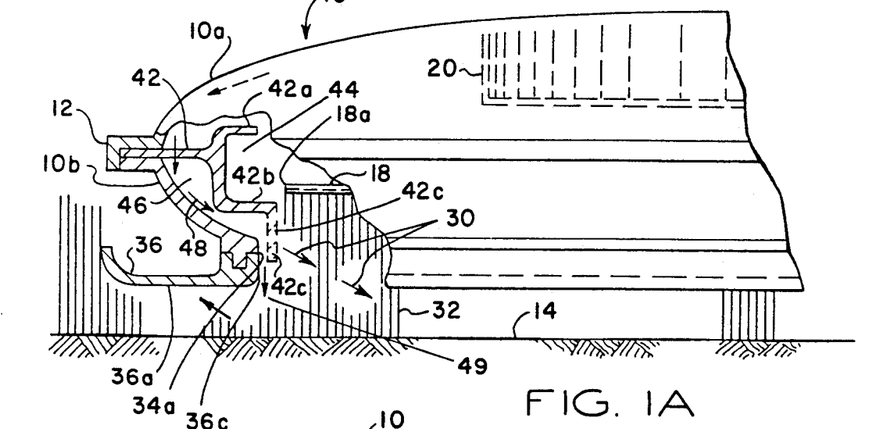

Referring now to FIG. 1A, an alternate embodiment is depicted wherein housing 10 includes a centrifugal raceway divider member 42 intermediate upper and lower housing portions 10a and 10b around the entire perimeter of housing 10. Divider member 42 includes a substantially C-shaped portion 42a spaced inwardly from interior walls 22 and 24. C-shaped portion 42a defines a C-shaped raceway 44 for centrifuging grass clippings. Distal end 18a of blade 18 is located slightly above bottom surface 42b of C-shaped portion 42a. Bottom surface 42b serves as a shelf for accepting grass cuttings projected outwardly by the tip speed of blade 18, to direct the grass clippings to a delivery port (not shown) for bagging or mulching.

Divider member 42 defines an air flow chamber 46 separate from centrifuge raceway 44. Air flow chamber 46 is intermediate housing 10 and C-shaped portion 24a. The air flow in chamber 46 is illustrated by arrows 48.

Divider 42 further includes a vertical extension portion 42c, which cooperates with vertical inner surface 34a of ring 34 and a vertical inner surface 36c of glide plate 36 for directing air vertically downward, as indicated by arrow 49, for flotation of housing 10. In contrast to FIG. 1, FIG. 1A depicts a single air-floated housing with a centrifuge raceway separate from an air pressure chamber in which air flows downwardly to float the housing by ground effect.

Figure 1B:
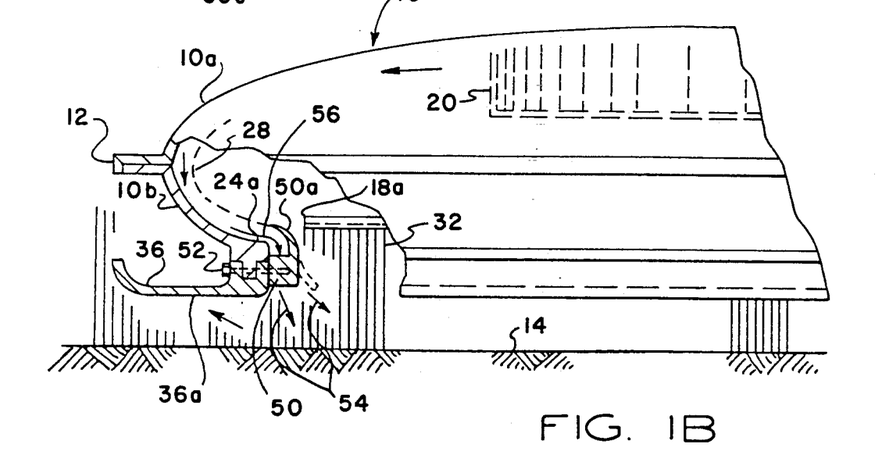

Referring to FIG. 1B, yet another alternate embodiment is depicted. In this embodiment, a diverter member 50 is attached by a bolt 52 or the like on the inside of a compression ring defined by vertical surfaces 34a and 36c (FIG. 1A). Diverter member 50 includes an opening (not shown), which is oriented to direct air in a desired direction, as indicated by arrows 54. Diverter member 50 includes an extension portion 50a, extending upwardly and outwardly for directing the air flow toward the opening in diverter member 50. Extension portion 50a also separates the air flow from the centrifuged cuttings delivered outwardly by the tip speed of blade 18. Distal end 18a of blade 18 is located slightly above extension portion 50a which is oriented to cooperate with lowermost portion 24a for channeling the air flow within region 56 between lowermost portion 24a and extension portion 50a.

Figure 3:
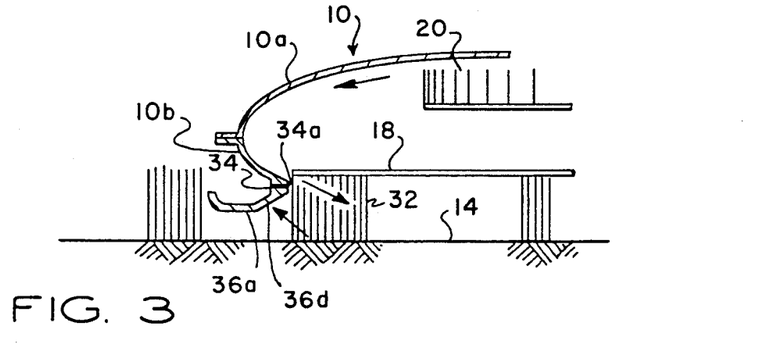
Figure 4:
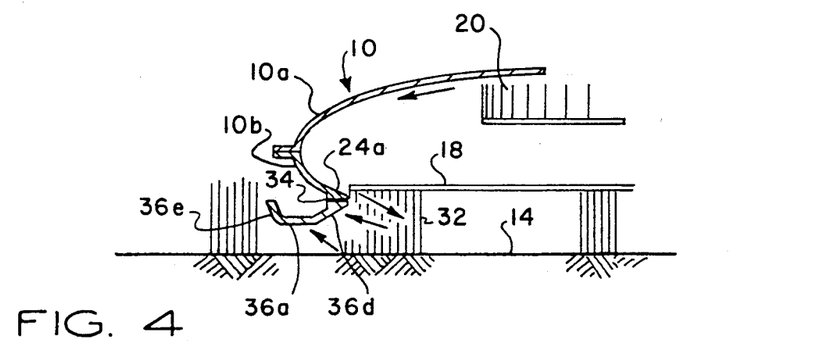
Figure 5:
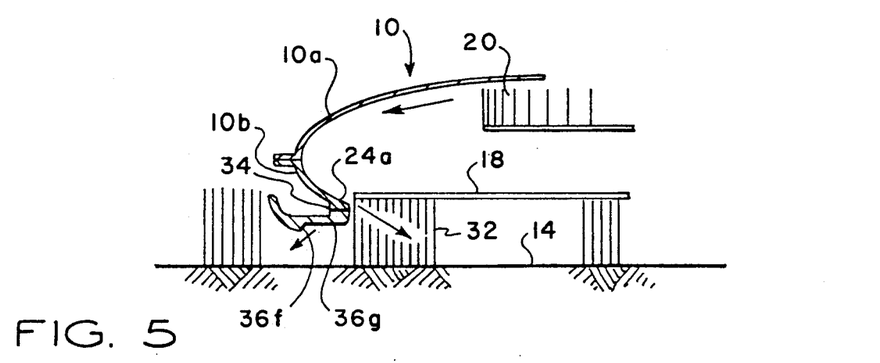

Referring now to FIGS. 2-5, there are illustrated in a plurality of alternate embodiments of FIG. 1. The angle of inclination with respect to the horizontal of lowermost portion 24a is variable between a minimum of approximately 10 degrees and a maximum of approximately 30 degrees for various ground effect angles of attack. Furthermore, the configuration of glide plate 36 is different among the embodiments shown in FIGS. 2-5. A surface 36d is oppositely sloped downwardly from vertical surface 34a at an angle of approximately 30 degrees. In FIG. 3, surface 36d is also sloped downwardly at an angle of approximately 30 degrees, but has a substantially greater outward extent than the corresponding surface 36d in FIG. 2. In FIG. 4, surface 36e slopes upwardly at an angle of approximately 30 degrees in opposed relationship to surface 36d. In FIG. 5, surface 36f is angled downwardly and outwardly at approximately 30 degrees with respect to horizontal bottom surface 36g. Downwardly sloped surface 36f enhances the lifting action on glide plate 36. Ring 34 functions as a compression ring and cooperates with glide plate 36 to reduce the escapement of air from beneath housing 10.

Figure 6:
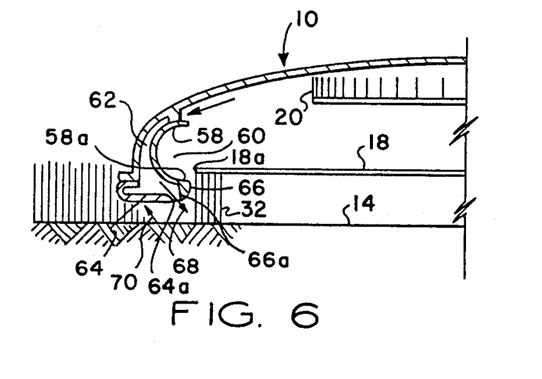
FIGS. 6 and 6A are respective partial cutaway side views of a lawn mower with a separate centrifuge chamber and an air pressure chamber, the air pressure chamber having an exhaust slot for exhausting air.

Referring to FIG. 6, a cup-shaped member 58 defines a centrifuge raceway 60 and separates raceway 60 from an air pressure chamber 62, which is intermediate member 58 and housing 10. Distal end 18a of cutting blade 18 is located slightly above a lowermost portion 58a of member 58. Lowermost portion 58a is adapted to receive cuttings projected outwardly by the tip speed of blade 18, to provide a shelf for centrifuging the cuttings, whereby the cuttings are delivered to a delivery port (not shown) for bagging or mulching. A plate member 64 is formed on a bottom portion of housing 10 and projects inwardly into chamber 62. An extension member 66 is formed below lowermost portion 58a and extends vertically downward therefrom. An inner peripheral edge 64a of plate member 64 cooperates with an inner surface 66a of vertical extension 66 to define a slot for escapement of air from chamber 62, as indicated by arrow 68. The undersurface of plate member 64 provides a lifting surface for air pressure acting thereon, as indicated by arrow 70, whereby the lifting force on housing 10 is enhanced.

Figures 6A, 7, 8:
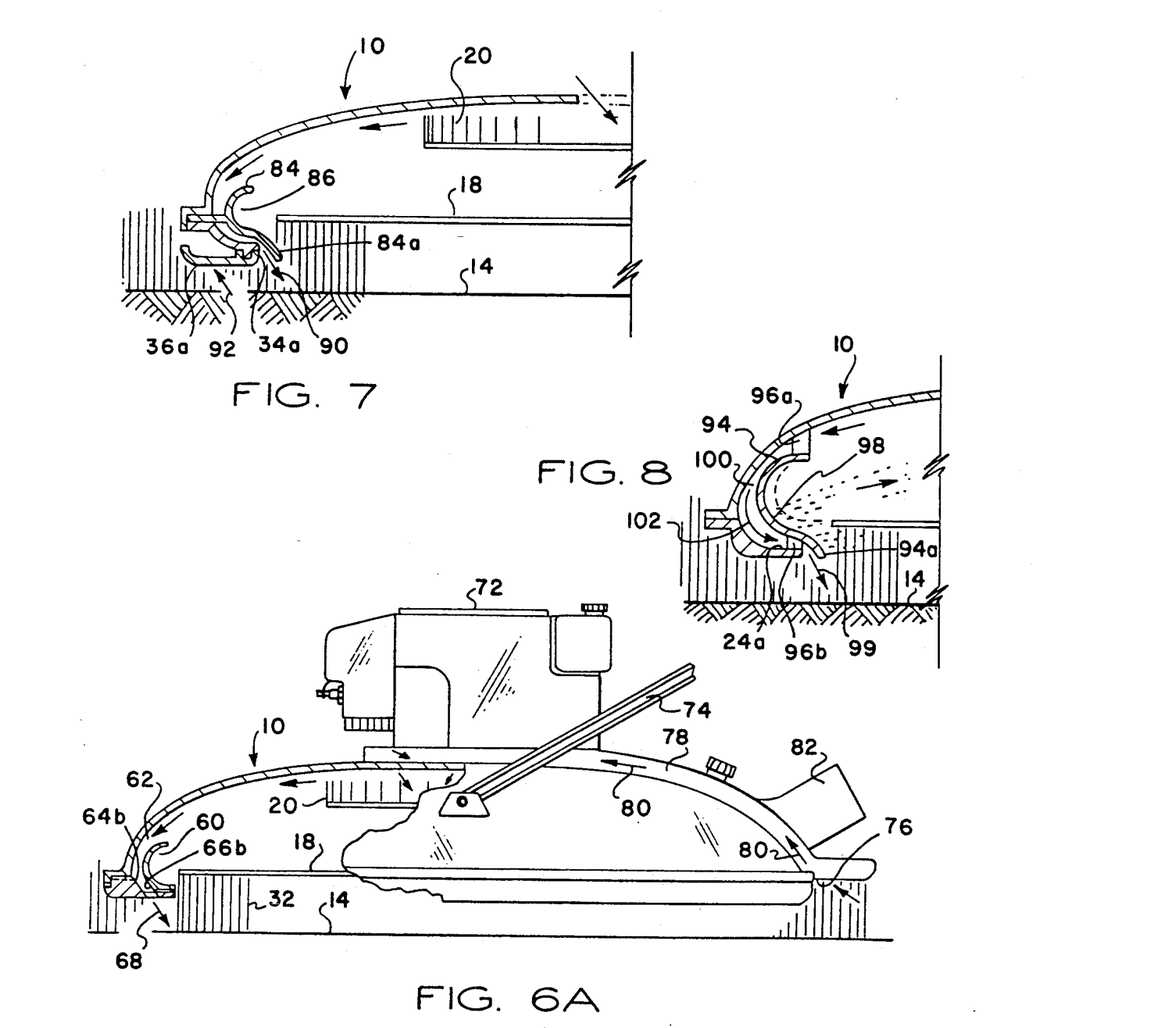
FIGS. 7, 8 and 9 are respective partial cutaway side views of a lawn mower with a molded centrifuge chamber separated from an air pressure chamber, illustrating various configurations for diverting air inwardly and downwardly within the air pressure chamber.

Referring now to FIG. 6A, an alternate embodiment of the invention shown in FIG. 6 is depicted. In FIG. 6A, plate member 64 and vertical extension 66 include downwardly and inwardly sloped surfaces 64b and 66b, respectively. Surfaces 64b and 66b are substantially in parallel relationship for directing the flow of air, as indicated by arrows 68 at a desired angle with respect to support surface 14. The embodiment depicted in FIG. 6A also differs from the embodiment depicted in FIG. 6 in that air pressure chamber 62 is not completely enclosed in FIG. 6A.

FIG. 6A also illustrates a complete lawn mower housing 10 with a drive motor housing 72 located centrally above lawn mower housing 10. A handle 74 is pivotally attached at an intermediate portion of housing 10, the attachment points being located on respective opposed sides of housing 10. Housing 10 further includes an inlet port 76, located at the rear of housing 10, for drawing air and grass clippings upwardly through a chamber 78 and another inlet port (not shown) communicating with impeller 20. The flow of air and grass cuttings through chamber 78 to impeller 20 is indicated by arrows 80. The clippings received by impeller 20 are then fed back to cutting blade 18 for further cutting and recycling. A delivery port 82 communicates with chamber 16 for receiving clippings for bagging.

Referring to FIG. 7, a cup-shaped member 84 is attached to housing 10 to define a centrifuge raceway 86 and an air pressure chamber 88 separate from raceway 86. A portion 84a of cup-shaped member 84 extends downwardly and inwardly from member 84. Extension portion 84a cooperates with vertical surface 34a to divert air flow downwardly and inwardly, as indicated by arrow 90 at a desired angle toward support surface 14. Air acting on undersurface 36a, as indicated by arrow 92, provides a lifting force on housing 10.

Referring to FIG. 8, a cup-shaped member 94 is attached to housing 10 by means of upper and lower bosses 96a and 96b to define a centrifuge raceway 98 inside member 94 and an air pressure chamber 100 between member 94 and housing 10. The flow of air within chamber 100 is indicated by arrows 102. Member 94 includes a lip 94a extending downwardly and inwardly from member 94. Lowermost portion 24a of interior wall 24 of housing 10 is oriented substantially horizontal for directing the air flow against lip 94a. Lip 94a air diverts the air flow downwardly and inwardly at a predetermined angle toward support surface 14, as indicated by arrow 99.

Figure 9:
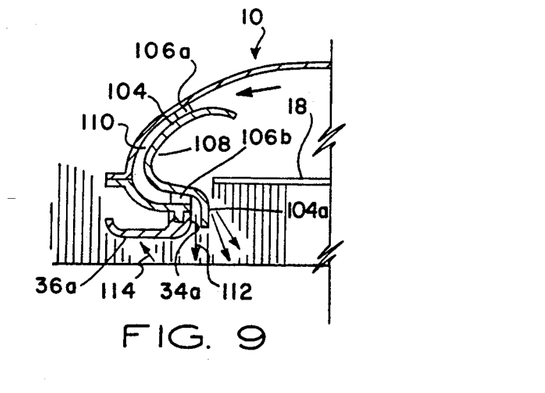

Referring to FIG. 9, a cup-shaped member 104 is attached to housing 10 by means of upper and lower bosses 106a and 106b. Member 104 defines a centrifuge raceway 108 inside of member 104 around the periphery of housing 10 and an air pressure chamber 110, separate from raceway 108, between member 104 and housing 10. A lip portion 104a extends vertically downward from member 104 and cooperates with vertical surface 34a for directing air flow substantially vertically downward, as indicated by arrow 112. The air acting on undersurface 36a, as indicated by arrow 114, provides lifting force on housing 10.

Figure 10:
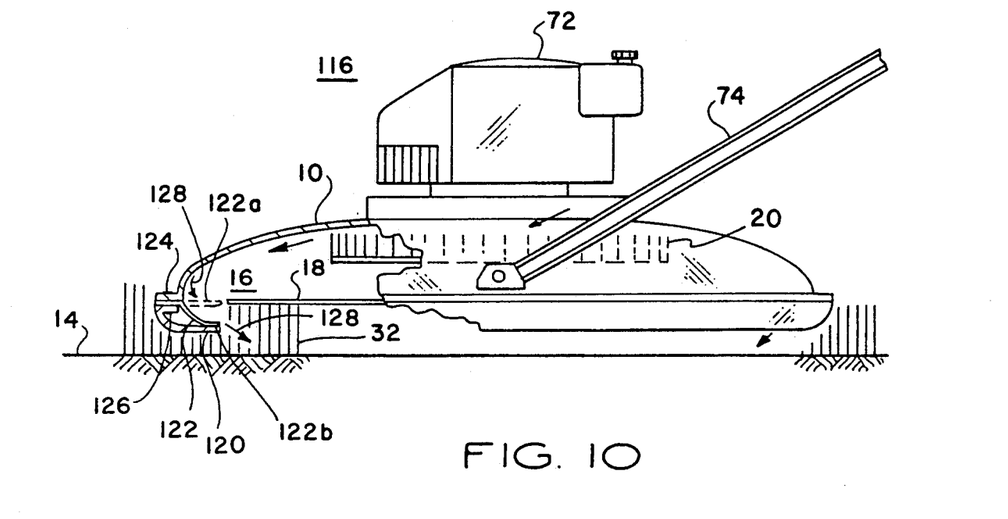
FIG. 10 is a partial cutaway side view of a lawn mower with a resilient member for directing air flow in the mower housing.

Referring now to FIG. 10, a lawn mower 116 includes a drive motor housing 72, mounted centrally on housing 10, and a handle 74, attached on respective opposite sides of housing 10. A resilient member 122 is attached to a flange 124 on an intermediate portion of housing 10. Resilient member 122 extends into chamber 16 at substantially the same level as cutting blade 18. The lower portion of housing 10 is defined by a plate member 120, extending inwardly from a flange 126, which is in facing engagement with flange 124. Plate member 120 is curved inwardly and downwardly from flange 126 and terminates in a relatively horizontal portion. Resilient member 122 is displaceable from a substantially horizontal position 122a to a declined position 122b in response to the amount of air pressure acting on resilient member 122. The air flow is indicated by arrows 128. The greater the air pressure the more resilient member 122 will be displaced away from horizontal position 122a. The flexibility of resilient member 122 allows for removal of grass cuttings and other particles, thereby providing a self-cleaning capability.

Figure 11:
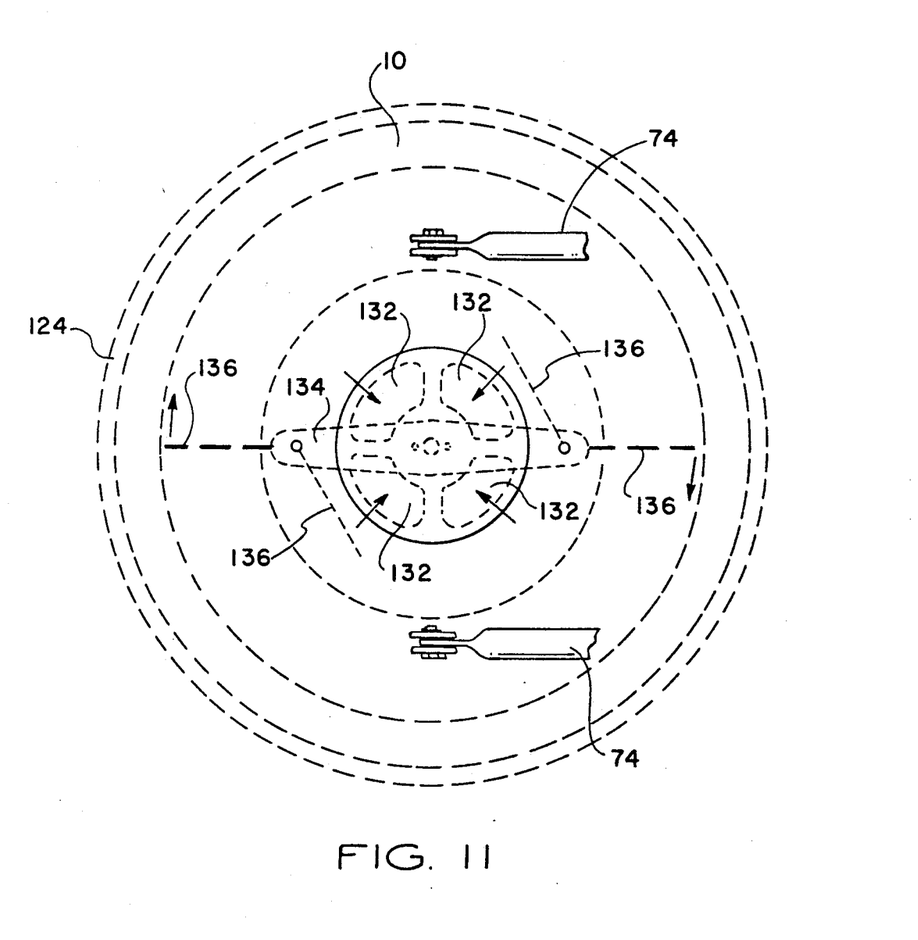
FIG. 11 is a top plan view of the apparatus of FIG. 10.

When flexible member 122 is in the declined position 122b, a distal edge of resilient member 122 conforms with a distal edge of plate member 120. Plate member 120 functions as a glide plate, to enhance the gliding movement of lawn mower 116 above support surface 14. An inwardly facing surface of resilient member 122 provides a shelf for centrifuging grass cuttings and for directing the flow of air downwardly and inwardly toward support surface 14. When resilient member 122 is in declined position 122b, a centrifuge raceway is defined similar to that illustrated and described above with reference to FIGS. 1-9. The raceway configuration is variable depending upon the amount of air pressure inside housing 10. The greater the air pressure, the more resilient member 122 will be displaced from horizontal position 122a. Referring to FIG. 11, housing 10 includes a plurality of air intake ports 132 in a top portion of housing 10. Cutting blade 18 preferably includes a rotatable mounting arm 134 with a plurality of swivel cutting blades 136 carried thereon.

Figure 12:
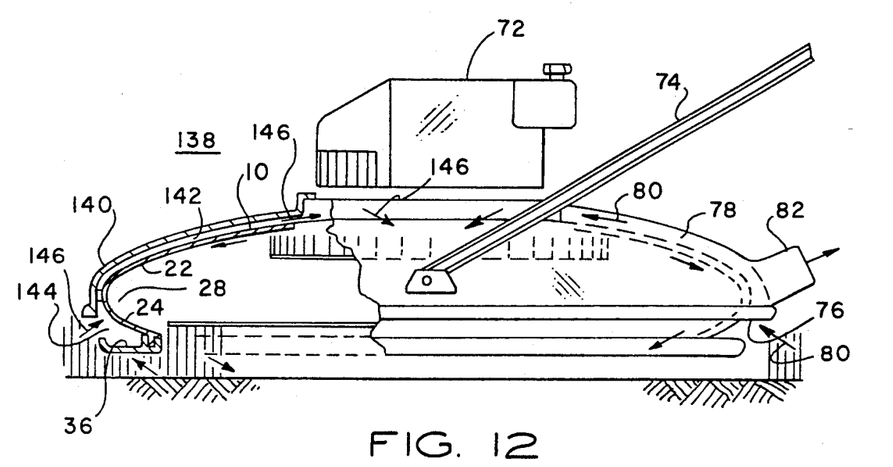
FIG. 12 is a partial cutaway side view of an alternate embodiment of the present invention, illustrating a debris removing chamber surrounding the housing.

Referring to FIG. 12, a lawn mower 138 is illustrated with a shroud 140 covering the outer and lower perimeter of housing 10. Shroud 140 is spaced apart from housing 10 to define a chamber 142 therebetween. Shroud 140 terminates above glide plate 36 to define an access opening 144 to chamber 142 on a front side portion of lawn mower 138. Dust and other small debris are sucked through chamber 142 into impeller 20, as indicated by arrows 146, and projected outwardly and downwardly along interior walls 22 and 24 for further cutting and recycling. Interior walls 22 and 24 provide a centrifuge raceway 28, combined with an air pressure chamber for directing air flow downwardly and inwardly within housing 10, as previously described with respect to FIG. 1. The centrifuged grass clippings are expelled from chamber 16 through discharge port 82. Clippings and other debris are also sucked through inlet port 76 and chamber 78, as indicated by arrows 80, into impeller 20.

Figure 13:
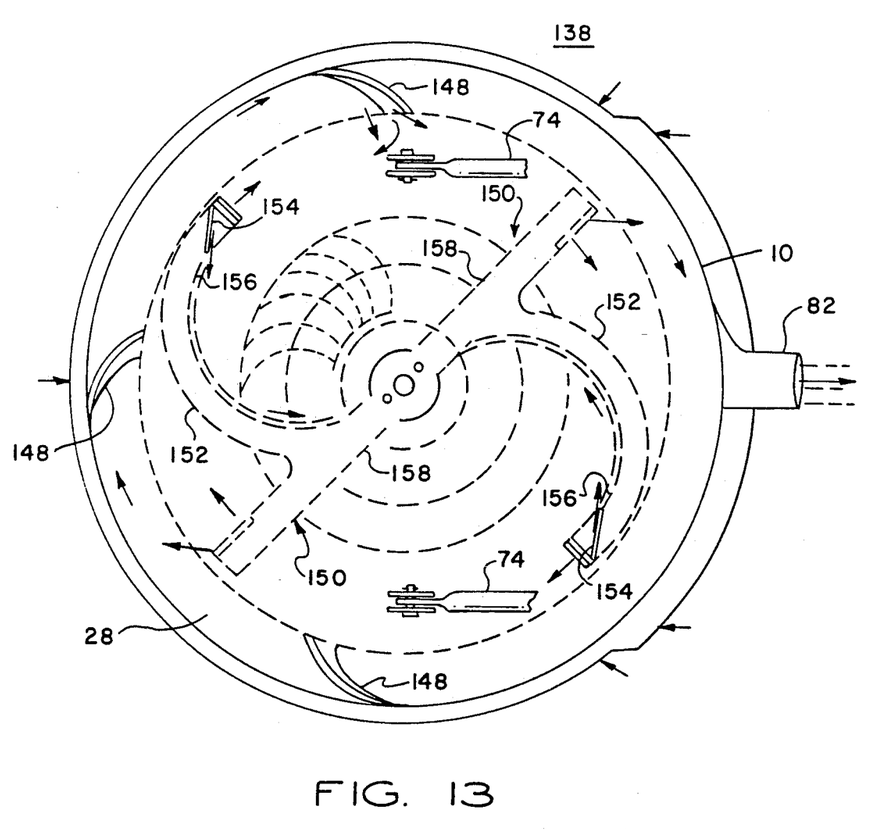
FIG. 13 illustrates a top plan view of the lawn mower of FIG. 12 illustrating diverter members in the centrifuge raceway for diverting grass clippings back into the cutting path for recutting and mulching, including a serpentine cutting blade configuration for enhancing mulching.

Referring to FIG. 13, lawn mower 138 further includes a plurality of curved diverters 148, located in centrifuge raceway 28. Diverters 148 divert the centrifuge clippings back into the path of a cutting blade 150 for recutting. Diverters 148 are located in the front half of centrifuge chamber 28, so as not to interfere with the discharge of cuttings through delivery port 82.

Blade 150 includes a serpentine portion 152. Serpentine portion 152 has a diverter 154 proximate to each end of serpentine portion 152 for diverting cuttings inwardly for recutting. Serpentine portion 152 further includes an upturned lip portion 156 proximate to each diverter 154 for receiving cuttings diverted inwardly by diverter 154 and for directing cuttings inwardly and downwardly to the soil level for mulch. Blade 156 further includes a conventional straight blade portion 158 for delivering cuttings outwardly through delivery port 82. A portion of the grass recut and conveyed to the soil level as mulch in relationship to the portion discharged through delivery port 82 for bagging is governed by the number of curved diverters 48 located in centrifuge chamber 28.

Figure 14:
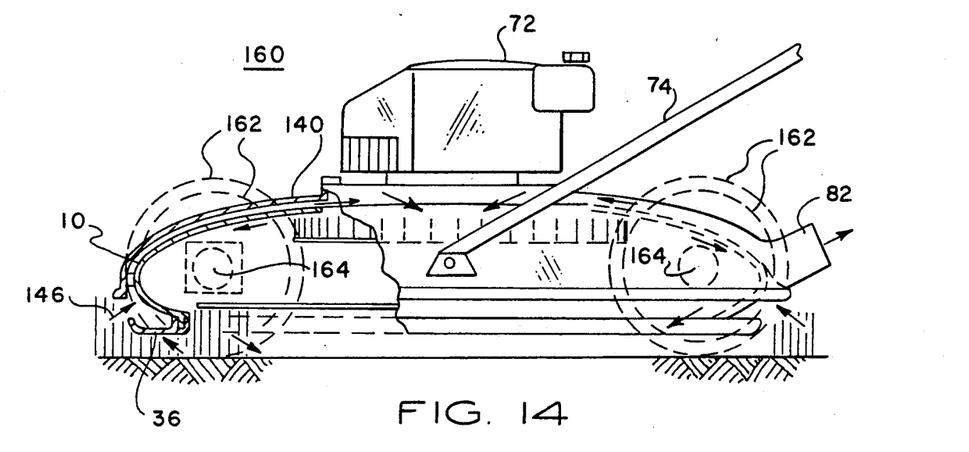
FIG. 14 is a partial cutaway side view of an alternate embodiment of the lawn mower of FIG. 12, with support wheels.
Figure 15:
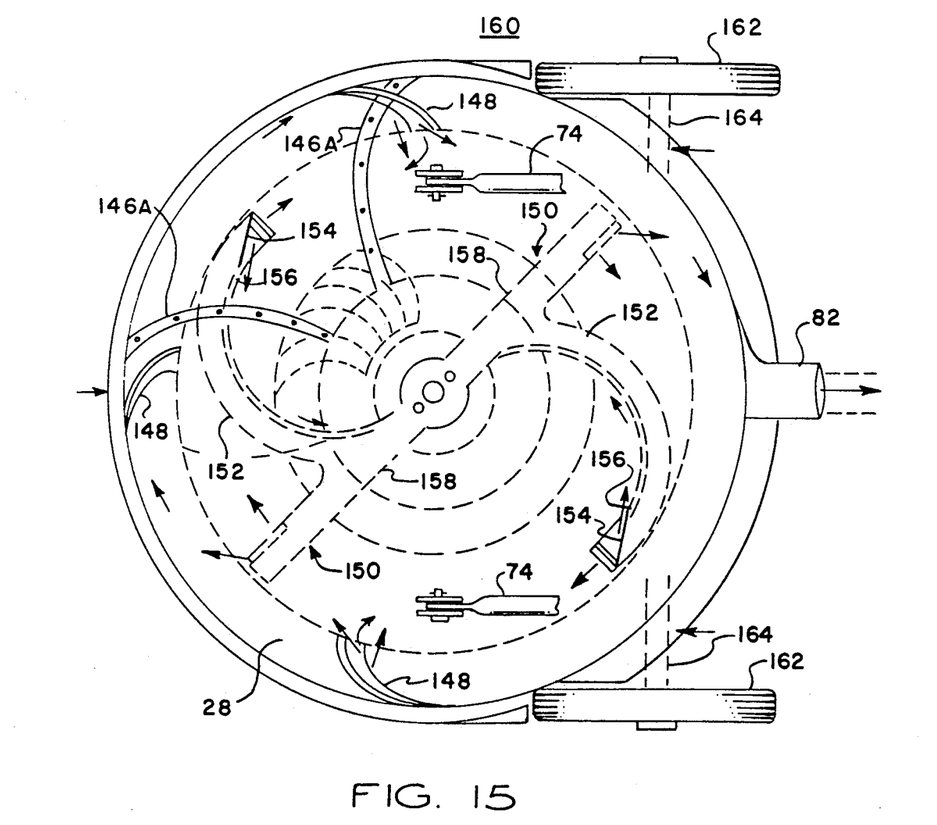
FIG. 15 is a top plan view of the lawn mower of FIG. 14, with only two wheels.

Referring to FIG. 14, lawn mower 160 is illustrated, which is substantially the same as lawn mower 138 depicted in FIG. 12, with the addition of four wheels 162. Two wheels 162 are located on respective opposed sides of lawn mower 160 at the front of lawn mower 160 and two wheels 162 are located on respective opposed sides of lawn mower 160 at the back of mower 160. Wheels 162 are carried on an axle 164. Referring also to FIG. 15, mower 160 is equipped with only two wheels 162, located just aft of drive motor housing 72, to allow housing 10 to float relative to the aft wheels 162.

Figure 16:
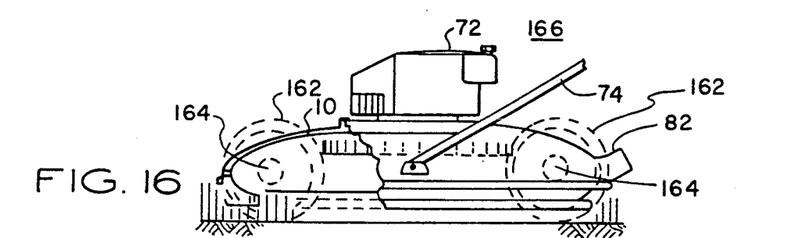
FIG. 16 is a cutaway side view of a wheel-supported lawn mower.
Figure 17:
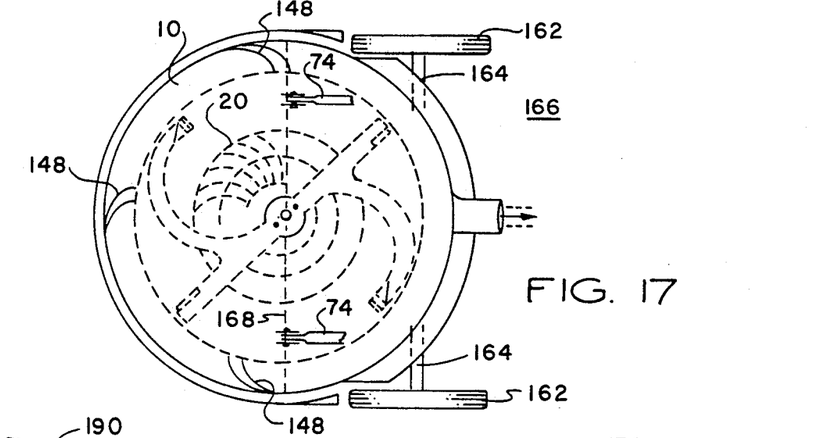
FIG. 17 is a top plan view of the lawn mower of FIG. 16.

Referring to FIGS. 16 and 17, a lawn mower 166 includes a baffle member 168 located slightly below impeller 20 for directing the air emanating from impeller 20 toward a forward portion of housing 10 for forward flotation of housing 10 with respect to wheels 162.

Figures 18, 19, 19A, 19B:
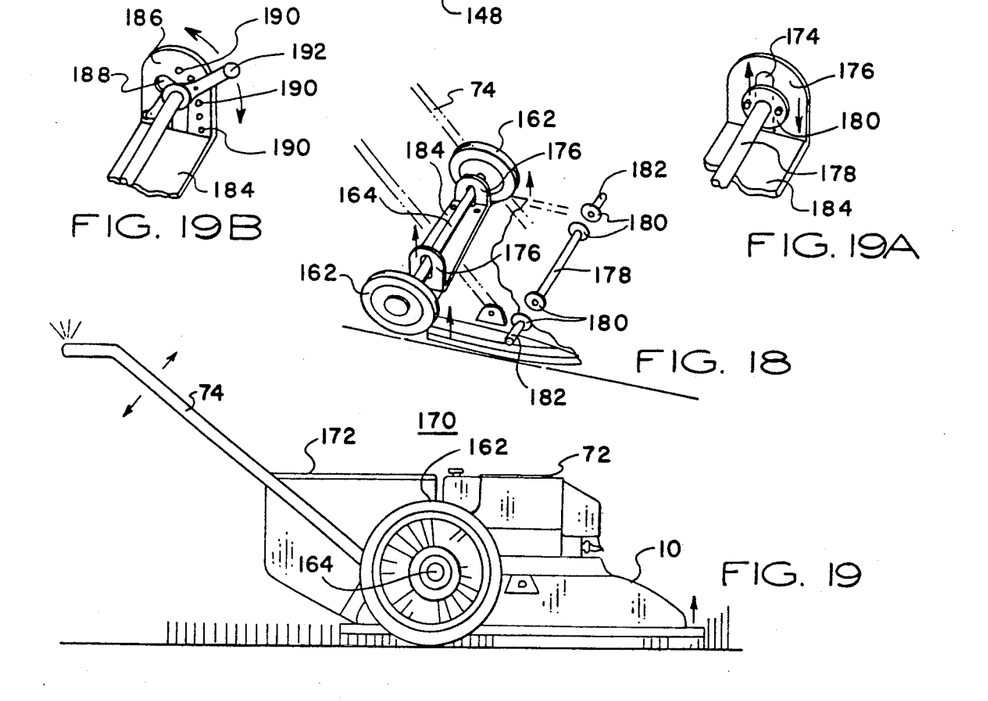
FIG. 18 is a detailed view of a wheel support mechanism for a lawn mower, allowing flotation of the lawn mower housing.
FIG. 19 is a side view of a lawn mower supported by the two wheels.
FIGS. 19A and 19B are detailed views of two alternate embodiments of a wheel support mechanism allowing flotation of the lawn mower housing.

Referring to FIGS. 18, 19, 19A and 19B, various wheel mechanisms are depicted. A lawn mower 170 includes a housing 10, a drive motor housing 72 located atop housing 10 and a rear grass catcher 172. Two support wheels 162 are located slightly aft of drive motor 72. Wheels 162 are supported by an axle 164, which is attached to housing 10, such that housing 10 is able to float vertically with respect to axle 164 and wheels 162. Axle 164 extends horizontally through aligned vertical slots 174 in upstanding brackets 176, as shown in FIGS. 18 and 19A. An elongated sleeve 178 with disc collars 180 at respective opposed ends thereof is adapted to receive the portion of axle 164 between brackets 176. Tubular spacers 182 with a disc collar 180 located at one end of each tubular spacer 182 are adapted to receive respective portions of axle 164 between brackets 176 and the corresponding wheels 162 to maintain a spacing between wheels 162 and the respective brackets 176. Brackets 176 extend upwardly from a deck 184 attached to a rear portion of housing 10. As shown in FIG. 19A, housing 10 is allowed to float vertically with respect to axle 164 and wheels 162 along the length of slots 174. An alternate embodiment of the wheel adjustment mechanism is depicted in FIG. 19B. Deck 184 has two brackets 186 extending generally upwardly from respective opposed ends thereof. Only one bracket 186 is shown. Each bracket 186 has an arcuate slot 188 for receiving axle 164 and a plurality of holes 190 for receiving a detent (not shown) attached to arm 192. By positioning the arm detent into a corresponding one of holes 190, the height of housing 10 is adjustable relative to the wheels for adjusting the cutting height. Rear mounted wheels 162 may also support the weight of the grass catcher aft deck housing and a portion of engine weight.

The preferred embodiment of the invention has now been described in detail. Since it is obvious that many changes in and additions to the above-described preferred embodiment may be made without departing from the nature, spirit and scope of the invention, the invention is not to be limited to the disclosed details, except as set forth in the appended claims.

I claim:

1. An air floated cutting apparatus, comprising:
a substantially endless housing having an interior surface and an exterior surface, a lower portion of said interior surface being angled inwardly and downwardly at an angle less than 30 degrees with respect to a horizontal axis for directing air inwardly and downwardly within said housing;
rotatable air moving means located in said housing for pressurizing air within said housing sufficient to float said housing above a support surface, air being moveable by said air moving means inwardly and downwardly along said lower portion of said interior surface;
rotatable cutting means located in said housing for cutting vegetation;
drive means for rotating said air moving means and said cutting means;
centrifuge means located in said housing and defining a centrifuge raceway for centrifuging vegetation cut by said cutting means; and
wherein an upper portion of said interior surface extends outwardly and downwardly, said upper portion cooperating with said lower portion to define said centrifuge means, said lower portion providing a shelf for the centrifuged cuttings.

2. An air floated cutting apparatus, comprising:
a substantially endless housing having an interior surface and an exterior surface, a lower portion of said interior surface being angled inwardly and downwardly at an angle less than 30 degrees with respect to a horizontal axis for directing air inwardly and downwardly within said housing;
rotatable air moving means located in said housing for pressurizing air within said housing sufficient to float said housing above a support surface, air being moveable by said air moving means inwardly and downwardly along said lower portion of said interior surface;
rotatable cutting means located in said housing for cutting vegetation;
drive means for rotating said air moving means and said cutting means;
centrifuge means located in said housing and defining a centrifuge raceway for centrifuging vegetation cut by said cutting means;
wherein said centrifuge means is spaced inwardly from said interior surface to define said centrifuge raceway inside said centrifuge means and an air pressure chamber separate from said centrifuge raceway between said centrifuge means and said interior surface, such that air can flow between an outer surface of said centrifuge means and said interior surface; and
wherein said centrifuge means includes diverter means for directing the flow of air in said air pressure chamber in a predetermined direction.

3. An air floated cutting apparatus, comprising:
a substantially endless housing having an interior surface and an exterior surface, a lower portion of said interior surface being angled inwardly and downwardly at an angle less than 30 degrees with respect to a horizontal axis for directing air inwardly and downwardly within said housing;
rotatable air moving means located in said housing for pressurizing air within said housing sufficient to float said housing above a support surface, air being moveable by said air moving means inwardly and downwardly along said lower portion of said interior surface;
rotatable cutting means located in said housing for cutting vegetation;
drive means for rotating said air moving means and said cutting means;
centrifuge means located in said housing and defining a centrifuge raceway for centrifuging vegetation cut by said cutting means; and
further including ring means extending around a bottom periphery of said housing, said ring means having a vertical inner surface for directing air vertically downward.

4. The apparatus of claim 3 further including plate means located on a bottom part of said ring means and extending substantially parallel to said horizontal axis, an undersurface of said plate means providing a surface for air pressure to exert a lifting force on said housing, said plate means cooperating with said ring means to inhibit the escapement of air from beneath said housing.

5. The apparatus of claim 4 wherein said plate means extends outwardly from said bottom part of said ring means.

6. An air floated cutting apparatus, comprising:
a substantially endless housing having an interior surface and an exterior surface, a lower portion of said interior surface being angled inwardly and downwardly at an angle less than 30 degrees with respect to a horizontal axis for directing air inwardly and downwardly within said housing;
rotatable air moving means located in said housing for pressurizing air within said housing sufficient to float said housing above a support surface, air being moveable by said air moving means inwardly and downwardly along said lower portion of said interior surface;

rotatable cutting means located in said housing for cutting vegetation;

drive means for rotating said air moving means and said cutting means;

centrifuge means located in said housing and defining a centrifuge raceway for centrifuging vegetation cut by said cutting means; and further including a shroud at least partially surrounding said housing and defining a suction chamber between said shroud and said housing, said air moving means being adapted to draw material from a support surface beneath the housing upwardly through said suction chamber and into said housing for cutting by said cutting means.

7. An air-floated apparatus, comprising:

a substantially endless housing having an open bottom and an air intake opening, said housing being adapted to cooperate with a support surface beneath said housing to define a substantially enclosed chamber;

air moving means located in said chamber for pressurizing air within said chamber sufficient to float said housing above the support surface, said air moving means being adapted to provide a downward flow of air in said chamber; and centrifuge means located in said chamber and defining a centrifuge raceway for centrifuging material in said chamber, said chamber being configured to accommodate centrifuging of material in the presence of air pressure sufficient to float said housing above the support surface.

8. Apparatus of claim 7 wherein said housing is a single deck housing.

9. An air-floated apparatus, comprising:

a substantially endless housing having an open bottom and an air intake opening, said housing being adapted to cooperate with a support surface beneath said housing to define a substantially enclosed chamber;

air moving means located in said chamber for pressurizing air within said chamber sufficient to float said housing above the support surface, said air moving means being adapted to provide a downward flow of air in said chamber;

centrifuge means located in said chamber and defining a centrifuge raceway for centrifuging material in said chamber, said chamber being configured to accommodate centrifuging of material in the presence of air pressure sufficient to float said housing above the support surface; and wherein said housing has an interior surface and exterior surface, said interior surface being configured to define said centrifuge raceway.

10. Apparatus of claim 9 further including separator means for separating said centrifuge raceway from said downward flow of air.

11. Apparatus of claim 9 wherein said interior surface is curved outwardly and downwardly at a predetermined radius of curvature in an upper portion of said housing and inwardly and downwardly at a predetermined radius of curvature in a lower portion of said housing to define said centrifuge raceway.

12. Apparatus of claim 9 wherein said centrifuge means is spaced inwardly from said interior surface to define said centrifuge raceway on one side of said centrifuge means and to accommodate said downward flow of air on an opposite side of said centrifuge means between said centrifuge means and said interior surface, whereby said downward flow of air is directed between said centrifuge means and said interior surface.

13. An air-floated cutting apparatus, comprising:

a substantially endless housing having an open bottom and an air intake opening, said housing being adapted to cooperate with a support surface beneath said housing to define a substantially enclosed chamber;

air moving means located in said chamber for pressurizing air within said chamber sufficient to float said housing above the support surface, said air moving means being adapted to provide a downward flow of air in said chamber;

cutting means located in said chamber for cutting vegetation; and centrifuge means located in said chamber and defining a centrifuge raceway for centrifuging in said chamber vegetation cut by said cutting means, said chamber being configured to accommodate centrifuging of vegetation in the presence of air pressure sufficient to float said housing above the support surface.

14. Apparatus of claim 13 wherein said housing is a single deck housing.

15. An air-floated cutting apparatus, comprising:

a substantially endless housing having an open bottom and an air intake opening, said housing being adapted to cooperate with a support surface beneath said housing to define a substantially enclosed chamber;

air moving means located in said chamber for pressurizing air within said chamber sufficient to float said housing above the support surface, said air moving means being adapted to provide a downward flow of air in said chamber;

cutting means located in said chamber for cutting vegetation;

centrifuge means located in said chamber and defining a centrifuge raceway for centrifuging in said chamber vegetation cut by said cutting means, said chamber being configured to accommodate centrifuging of vegetation in the presence of air pressure sufficient to float said housing above the support surface; and wherein said housing has an interior surface and exterior surface, said interior surface being configured to define said centrifuge raceway.

16. Apparatus of claim 15 further including separator means for separating said centrifuge raceway from said downward flow of air.

17. Apparatus of claim 15 wherein said interior surface is curved at a predetermined radius of curvature outwardly and downwardly in an upper portion of said housing and inwardly and downwardly at a predetermined radius of curvature in a lower portion of said housing to define said centrifuge raceway.

18. Apparatus of claim 15 wherein said centrifuge means is spaced inwardly from said interior surface to define said centrifuge raceway on one side of said centrifuge means and to accommodate said downward flow of air on an opposite side of said centrifuge means between said centrifuge means and said interior surface, whereby said downward flow of air is directed between said centrifuge means and said interior surface.

* * * * *